US010768807B2

(12) United States Patent
Akitomo

(10) Patent No.: US 10,768,807 B2
(45) Date of Patent: Sep. 8, 2020

(54) DISPLAY CONTROL DEVICE AND RECORDING MEDIUM

(71) Applicant: SHARP KABUSHIKI KAISHA, Sakai, Osaka (JP)

(72) Inventor: Kenji Akitomo, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 16/147,722

(22) Filed: Sep. 29, 2018

(65) Prior Publication Data
US 2019/0102081 A1 Apr. 4, 2019

(30) Foreign Application Priority Data

Sep. 29, 2017 (JP) .................. 2017-191548

(51) Int. Cl.
G06F 3/0488 (2013.01)
G09G 3/20 (2006.01)
G06F 3/0484 (2013.01)
G06K 9/22 (2006.01)

(52) U.S. Cl.
CPC ...... *G06F 3/04883* (2013.01); *G06F 3/04845* (2013.01); *G06K 9/222* (2013.01); *G09G 3/20* (2013.01)

(58) Field of Classification Search
CPC .... G06F 3/04883; G06F 3/04845; G06F 3/20; G06K 9/222
See application file for complete search history.

(56) References Cited

U.S. PATENT DOCUMENTS 5,698,822 A * 12/1997 Haneda ............... G06F 3/04883
178/18.01
2005/0102620 A1 * 5/2005 Seto ....................... G06K 9/222
715/268

FOREIGN PATENT DOCUMENTS

JP 2008-084136 A 4/2008
JP 2014-092829 A 5/2014

* cited by examiner

*Primary Examiner* — Mark Edwards
(74) *Attorney, Agent, or Firm* — ScienBiziP, P.C.

(57) ABSTRACT

A display control device includes an identification information reception unit that receives identification information from an input device, an input unit that can receive a handwriting input through the input device, an object generation unit that generates an object from the handwriting input, and a display control unit that performs control of displaying the object on a display area, in which the object generation unit generates a tag object or a drawing object from the handwriting input based on the identification information.

7 Claims, 8 Drawing Sheets

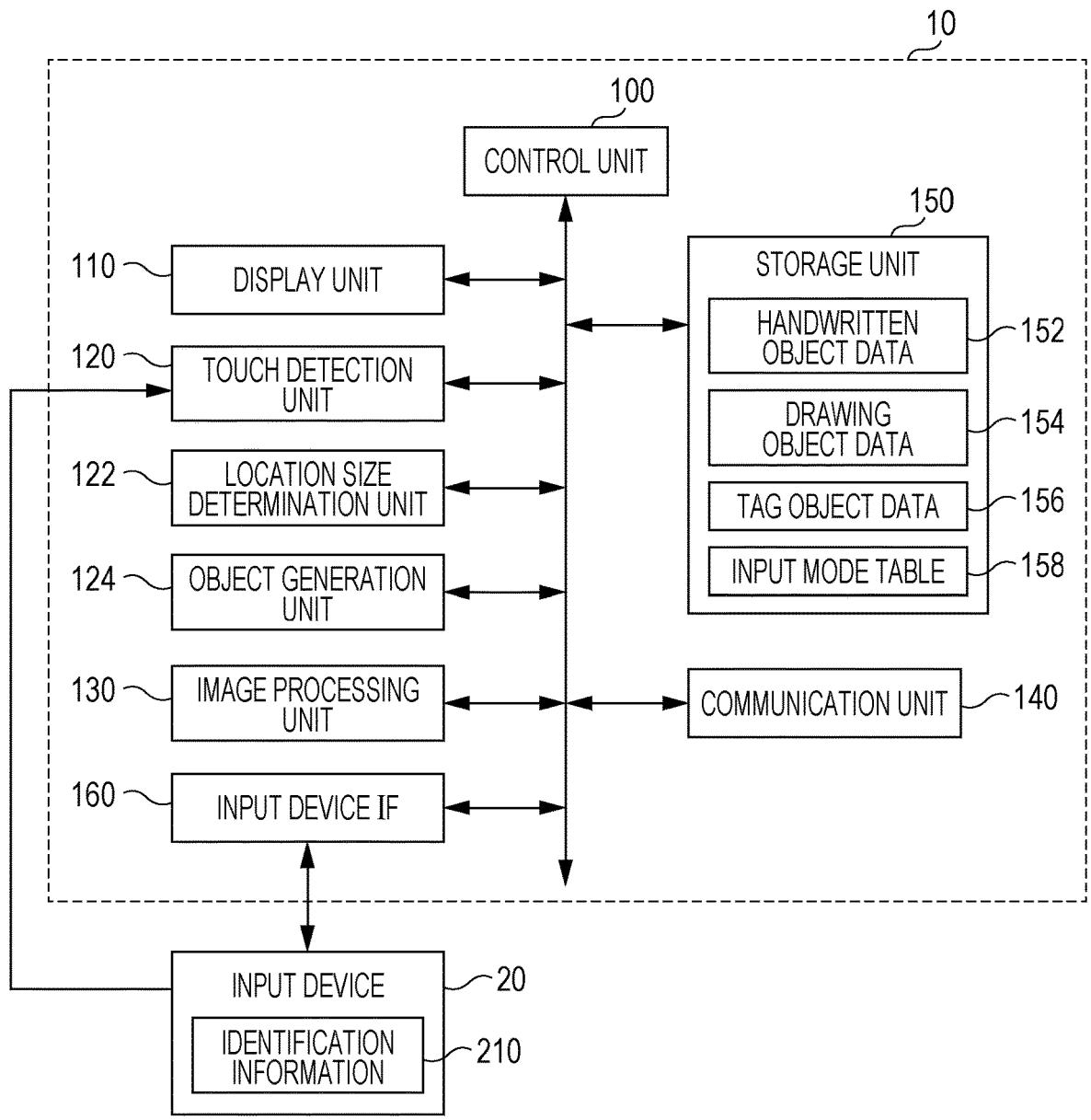

DISPLAY CONTROL DEVICE AND RECORDING MEDIUM

BACKGROUND

1. Field

The present disclosure relates to a display control device or the like which controls an object to be displayed on a display area of a display unit.

2. Description of the Related Art

In recent years, since display devices, in each of which a large-sized display is provided, are becoming widespread, scenes where meetings and lessons are performed are increasing while utilizing the display device like an electronic blackboard. In a case where brainstorming is performed by using such a display device, a method (for example, KJ method), in which an idea as a memo is attached, is often used.

Here, as a method of realizing display like a tag, for example, in Japanese Unexamined Patent Application Publication No. 2014-92829, a technology is disclosed in which a predetermined selection movement operation for selecting and moving a part or the whole of the image currently being displayed as a movement target image and a predetermined selection operation for selecting a part of the image currently being displayed as a movement prohibition image can be received, and display control for moving the movement target image is performed in a state where the movement prohibition image is displayed as it is at the current display location, in a case where the predetermined selection movement operation is received, in a state where the movement prohibition image according to the predetermined selection operation is selected.

In addition, as a technology for displaying handwritten characters in reduced form, for example, in Japanese Unexamined Patent Application Publication No. 2008-84136, a technology is disclosed in which input handwritten data is converted into image data as a block, reduced image data is created by reducing the image data with a fixed aspect ratio so that a width corresponding to a row pitch of the image data is equal to or less than a row pitch of a predetermined display area on a display screen, and the reduced image data is sequentially arranged and displayed in a row direction on a predetermined display area.

In Japanese Unexamined Patent Application Publication No. 2014-92829 described above, although it is apparently displayed like a tag, it is not possible to be actually or freely moved as the tag, and has not good usability.

In addition, in brainstorming or the like, there are cases in which a plurality of users write characters or figures on the same sheet and want them to be displayed as the tag. Due to recent improvements in the performance of display devices such as a large-sized display and detection of multi-touch, such a need increases.

However, in an apparatus of the related art, since it is not assumed that a plurality of users write, it is demanded to switch tag data each time when the tag data is written. In addition, even in a case where a type (attribute) of the tag is switched for each user, it is demanded to select from a menu or the like every time, and it is hard to mention that usability is good.

Especially, there is a talk flow in the brainstorming or the like and it is important to issue ideas properly each time. However, as described above, there is a problem that the talk flow is interrupted when a work to switch on the menu or the like is performed each time.

SUMMARY

It is desirable for a display control device of the present disclosure to be able to display and arrange an appropriate object by using identification information received from an input device.

According to an aspect of the disclosure, there is provided a display control device that performs control to cause a display unit to display an object on a display area, and includes an identification information reception unit that receives identification information from an input device, an input unit that can receive a handwriting input through the input device, an object generation unit that generates the object from the handwriting input, and a display control unit that performs control of displaying the object on the display area, in which the object generation unit generates a tag object or a drawing object from the handwriting input based on the identification information.

According to another aspect of the disclosure, there is provided a recording medium that stores a program causing a computer of a display control device, which performs control to cause a display unit to display an object on a display area, to realize, an identification information reception function of receiving identification information from an input device, a reception function of receiving a handwriting input through the input device, an object generation function of generating the object from the handwriting input, and a display control function of performing control of displaying the object on the display area, in which, in the object generation function, a tag object or a drawing object is generated from the handwriting input based on the identification information.

BRIEF DESCRIPTION OF THE DRAWINGS

FIG. 2 is a diagram for explaining a functional configuration of a display apparatus according to the first embodiment;

FIG. 3 is a diagram for explaining an example of an input mode table according to the first embodiment;

DESCRIPTION OF THE EMBODIMENTS

Hereinafter, a display apparatus 10 using a display control device of the present disclosure will be described. Each embodiment is described for the convenience of explaining the present disclosure, and the scope of the present disclosure is not limited to the following embodiments.

1. First Embodiment

1.1 Overall Structure

Figure 1:
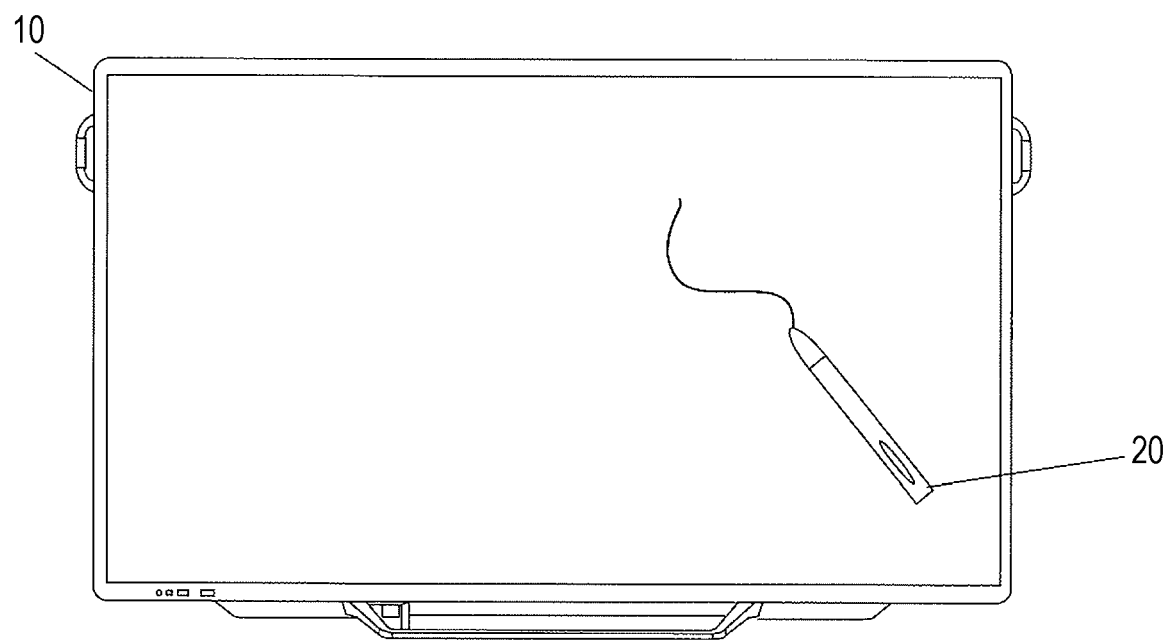
FIG. 1 is a diagram for explaining the entire system according to a first embodiment.

First, a first embodiment will be described. FIG. 1 is a diagram showing an appearance of the display apparatus 10 according to the present embodiment. The display apparatus 10 is an apparatus capable of a touch operation, and an object can be input by using an input device 20.

Here, the object in the present embodiment is a unit which can be displayed on one or a plurality of display screens, and, for example, the object may be any of figures, characters (character strings), icons, photographs, and the like which are input by handwriting. In addition, tag data (tag image data and memo data) which can be moved, deleted, or changed in attributes on figures input by the handwriting as one unit, can also be handled as a tag object that is one of the objects.

That is, the tag object is an object for realizing such a function as a general tag note has on a display screen. For example, the tag objects are displayed on a display screen to be overlapped with respective objects.

The tag object can be freely attached or removed (deleted). In addition, it is possible to change a color of background, change a size, or change transmittance.

For example, a tag layer may be provided on a layer (for example, display layer) in which another object is present, and the tag object may be attached on the tag layer. In addition, in a case where the tag object is attached to the same layer as that of other objects, attributes may be provided so as to be displayed on the front. In general, the tag object is displayed in front of other objects in preference to other objects, but the tag object may be handled in the same way as ordinary objects according to user settings.

1.2 Functional Configuration

Then, a functional configuration of the display apparatus 10 in the present embodiment will be described based on FIG. 2. The display apparatus 10 is configured to include a control unit 100, a display unit 110, a touch detection unit 120, a location size determination unit 122, an object generation unit 124, an image processing unit 130, a communication unit 140, a storage unit 150, and an input device interface (IF) 160.

The control unit 100 is a functional unit for controlling the entirety of the display apparatus 10. The control unit 100 realizes various functions by reading and executing various programs stored in the storage unit 150, and is configured with, for example, a central processing unit (CPU).

The display unit 110 is a functional unit of displaying the object, content, or the like. For example, the display unit 110 is configured with a liquid crystal display (LCD), an organic EL display (OLED), or the like. In addition, there is a display area on the display screen of the display unit 110, and it is possible to arrange and display various objects on the display area.

The touch detection unit 120 is a functional unit of realizing an operation input by detecting a touch operation from a user. For example, the touch detection unit 120 is realized by a touch panel or the like, configured integrally with the display unit 110. As a method of detecting the touch operation, any method such as an electrostatic capacity method, an electromagnetic induction method, an infrared method, or the like may be used. In addition, a detection location may be one point or may be plural points that can be detected.

In addition, in the present embodiment, by detecting a touch operation on the input device 20, an operation input is realized. Since it is sufficient that the touch detection unit 120 can detect the touch operation, for example, the input device 20 is configured with a touch pen compatible with a pressure sensitive type or a touch pen provided with a conductive material compatible with a capacitance type corresponding to a touch panel method. In addition, it may be an active type touch pen that performs direct communication.

In addition, the input device 20 can be connected via an input device IF 160. For example, the input device IF 160 may use a short-range wireless communication method such as Bluetooth (registered trademark), a unique wireless communication method, or the like. In addition, when it is the active type touch pen, the input device 20 and the display apparatus 10 may communicate with each other.

That is, in the present embodiment, identification information 210 of the input device 20 can be received by the display apparatus 10. The identification information 210 may be information for uniquely identifying the input device 20, and a unique ID, a device ID, or the like is used.

In addition, the input device 20 may also include a pressure detection sensor and a gyro sensor, and may also transmit pressure information, attitude information, and location information.

That is, the input device 20 is connected to the display apparatus 10 via the touch detection unit 120 and/or the input device IF 160, and the display apparatus 10 can acquire at least a location (position in which touch is detected) in which the touch operation is performed and the identification information.

The location size determination unit 122 determines the location and size of the object (for example, handwritten object input through input device 20) configured based on inputted handwritten input data (for example, stroke information). In addition, the object generation unit 124 is a functional unit of creating the handwritten object from the inputted handwritten input data, and other objects. The handwritten input data based on input stroke may be processed so as to simply generate a handwritten drawing object, or may be recognized as characters and symbols so as to generate a text object.

The image processing unit 130 is a functional unit of realizing an image process. For example, the image processing unit 130 is a functional unit that performs various image processes such as a sharpening process on an image and a process for changing smoothness with respect to stroke data.

In addition, a process of outputting a text character (string) by performing character recognition from the inputted handwritten input data (handwritten object), or converting a drawing object into vector data or raster data, may be performed.

The location size determination unit 122, the object generation unit 124, and the image processing unit 130 may be realized by storing a program for each process in the storage unit 150 according to need and by reading and executing the program according to need.

The communication unit 140 is a functional unit of performing communication of the display apparatus 10. For example, wireless LAN such as IEEE 802.11 a/b/g/n is used or short-range wireless communication such as Bluetooth (registered trademark) is used. General communication may be performed by LTE communication or the like.

The storage unit 150 is a functional unit of storing various programs and various data demanded for an operation of the display apparatus 10. For example, the storage unit 150 is configured with a solid-state drive (SSD) that is a semiconductor memory, a hard disk drive (HDD) that is a magnetic disc, and the like.

In addition, handwritten object data 152 in which the handwritten object generated based on the handwritten input data as the object is stored, drawing object data 154 in which the drawing object generated from the handwritten object is stored, tag object data 156 in which the tag object is stored, and an input mode table 158 are stored in the storage unit 150, in addition to the various programs.

A result obtained by processing handwritten input data that is input by handwriting as a block and by outputting as the handwritten object is stored in the handwritten object data 152. For example, the handwritten input data (stroke information) that is input by the handwriting of the user is collected, and the collected result is stored as one grouped figure object.

An object displayed on the display area as the drawing object is stored in the drawing object data 154. For example, the handwritten object may be stored as it is, or may be stored with attributes such as color information and line thickness added. In addition, for example, depending on an input mode, the handwritten object may be converted into a rectangular or circular drawing object and stored.

The tag object converted from the handwritten object to have a predetermined size is stored in the tag object data 156. Specifically, in the tag object, the tag size with a uniform size is determined. In addition, a tag label corresponding to the tag size is determined, and the handwritten object is composited to be included in the tag label and becomes the tag object.

For the tag size, a predetermined size as a size of the tag object is determined. In addition, the tag label of the tag size is determined as an image (figure) object. By performing drawing of the tag label, it is possible for the user to easily check that it is the tag object. In addition, for example, in a case where the tag size is set to 80 pixels in a vertical direction and 160 pixels in a horizontal direction, a rectangular tag label corresponding to the size is set. An identification display indicating that it is different from an ordinary rectangular figure may be adopted.

The tag size is a size at the time of generating the first tag object and it is possible to change the size after the generation of the tag object. That is, by changing the size of the tag label, a size of the entirety of the tag object is changed. Accordingly, a size of the handwritten object included in the tag label and displayed is also changed in conjunction.

In addition, by being converted into the tag object from the handwritten object, movement, change in attributes, and size changing can be easily performed, or switching of display/non-display, arrangement, and the like can be easily performed.

In the present embodiment, although the tag object is generated based on a figure input by handwriting, the tag object may be generated from, for example, a text character string and other objects (for example, image file or the like).

In addition, the tag object may be displayed by overlapping with other displayed objects (for example, figure and image) or may be displayed independently from other objects. In addition, in the present embodiment, although it is displayed as the tag object, other display methods such as memo data and memorandum data may be adopted.

In the present embodiment, for convenience of explanation, the drawing object and the tag object are described as types of objects to be displayed, but other objects may be stored as long as the objects can be displayed on the display area.

For example, it is possible to appropriately store and display an image object based on the image file of JPEG data and BMP data from a scanner, a digital camera, an image file, or the like, a text object (character includes handwritten characters written by user with a touch pen, hand, mouse, or the like, and text characters indicated by ASCII code, JIS code, Unicode, or the like) made of a character (symbol) string, and a content object displayable with other files.

As shown in FIG. 3, the input mode table 158 is a table for storing a result obtained by associating the identification information of the input device 20 (for example, "PE 01") and an input mode (for example, "handwriting pen mode").

The input mode indicates that as what type of the object the handwritten object is output. For example, the handwritten object is output as the drawing object in the handwriting pen mode, and the handwritten object is output as the tag object in a tag pen mode. As another case, for example, in a case of a text pen mode, the handwritten object is recognized as a text, and output as the text object.

1.3 Flow of Processing

A flow of processing in the present embodiment will be described with reference to the drawings.

First, the handwriting input is detected (step S102). In a case where the handwriting input is detected, the input coordinates of handwriting detecting and/or the identification information which are input are acquired (step S102; Yes→step S104), and output as the handwritten input data.

That is, it is possible to receive the identification information of the input device 20 that is currently input together with coordinates, strokes, and the like acquired as the handwritten input data. Although the identification information is normally received while the handwriting input is performed, the identification information may be received once for the first time. In addition, the received identification information may be stored together with the handwritten input data, or may be stored by being associated with the handwritten object.

Here, in a case where the handwritten input is continuously received, the handwritten input as the handwritten input data based on the acquired input coordinates is output as it is (step S106; No→step S104). At this time, locus of the input device 20 (touch pen) becomes the handwritten input data, and a line is drawn on the display area according to locus of the input device 20.

Here, in a case where a predetermined period of time elapses after the handwriting input is interrupted (for example, when a predetermined period of time elapses for touch-up), the handwritten input data is processed as one block and output as the handwritten object (step S106; Yes→step S108).

Here, it is determined whether or not the input handwritten object is input in the tag pen mode, based on the identification information of the input device 20 (step S110). Here, in a case where the input handwritten object is input in a mode other than the tag pen mode (in the present embodiment, "handwriting pen mode"), the handwritten object is generated and output as the drawing object (step S116). That is, in a case of the present embodiment, the handwritten object is displayed as it is as the drawing object on the display area.

In addition, if the input mode is the "tag pen mode" (step S110; Yes), a size of the handwritten object is adjusted to the tag size (step S112). Specifically, the handwritten object is reduced or enlarged within a range fitting to the tag size which is a predetermined size. At this time, in a case where it does not fit in the tag size, it may be displayed in a reduced size, or it may be displayed in the reduced or enlarged size so as to be displayed at the maximum size of the tag size.

Then, a result obtained by combining the adjusted handwritten object and the tag label is generated and output as the tag object (step S114). That is, the tag object is displayed on the display area.

Here, in a case where the tag object is generated, the tag size indicating the size of the tag object is adjusted so as to be an initial size. With this, when the tag object with a uniform size is output and arranged on the display screen, it is possible to arrange the tag objects with good viewability.

In addition, as a method of arrangement, for example, it may be arranged from the upper left to the right, or may be arranged from the upper right to the lower. That is, where to start the arrangement and in which direction arrangement is performed may be set by a system, or may be set by the user.

Then, a redrawing process of a screen is performed (step S118). In the redrawing process of screen, redrawing on the entirety of the screen is performed. Here, different operations may be performed to the tag object and other objects.

For example, in a case where the objects are arranged on a sheet, the displayed objects are changed by switching a page of the sheet. Even when the page of sheet is switched, it may be displayed such that the tag object is continuously displayed as it is.

In addition, even in a case where operations such as enlarging, reducing, and moving of other objects are performed, the tag object may be displayed as it is at the same location.

That is, the tag object may be displayed in conjunction with other objects, or may be displayed differently from other objects.

1.4 Operation Examples

Figure 5A:
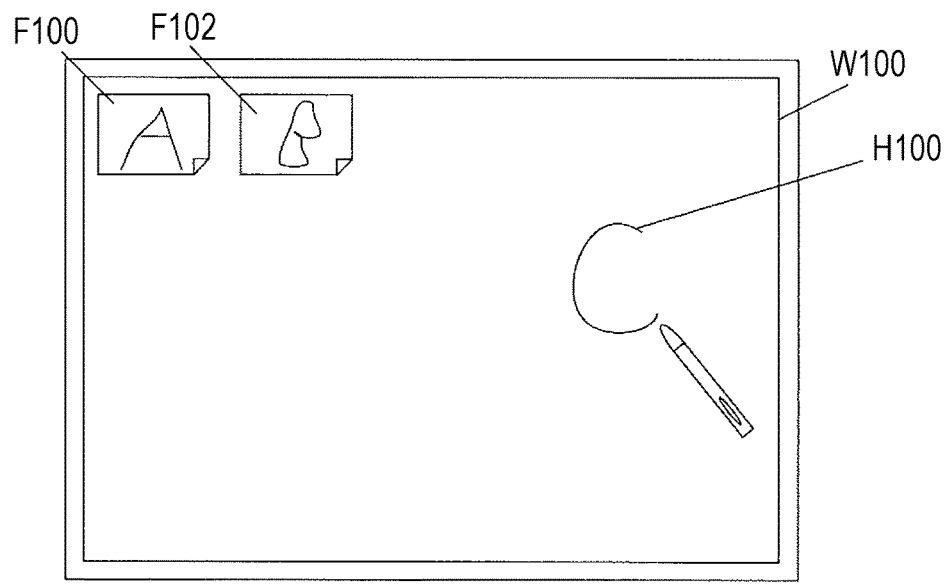
FIGS. 5A to 5C are diagrams for explaining operation examples according to the first embodiment.
Figure 5B:
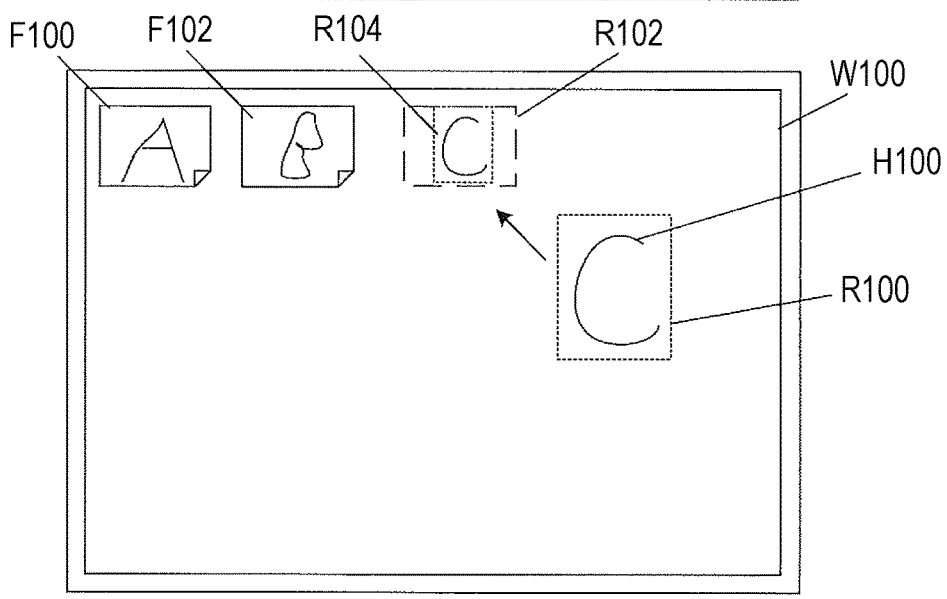
Figure 5C:
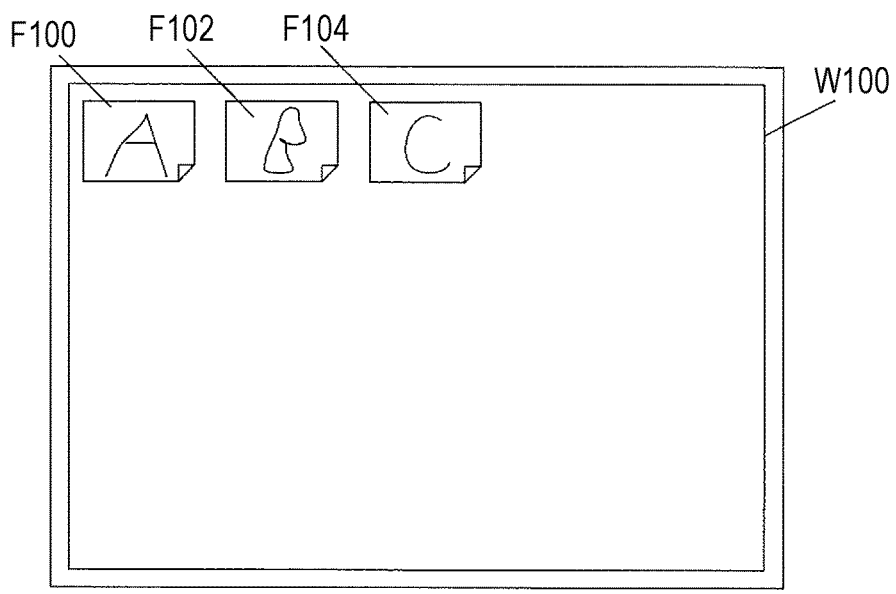

Operation examples in the present embodiment will be described by using FIGS. 5A to 5C. FIGS. 5A to 5C are diagrams each showing an example of a display screen W100 in the present embodiment.

On the display screen W100 of FIG. 5A, a tag object F100 and a tag object F102 are already arranged and displayed. The tag object is displayed with the handwritten object fit in the tag label.

Here, a handwritten object H100 is input through the input device 20. Specifically, the handwritten input data is input according to the locus of the input device 20, and is displayed as the handwritten object H100 when a predetermined period of time elapses after the touch-up.

At this time, it is possible to identify the handwritten object H100 is input in the tag pen mode from the identification information of the input device 20.

FIG. 5B is a schematic diagram for explaining a process. That is, an area R100 including the handwritten object H100 is recognized. The handwritten object is reduced so as to enter into a size of an area R102 which is the tag size as the tag object such that it becomes a size of an area R104.

As described in FIG. 5C, the handwritten object reduced on the tag label is reduced such that the handwritten object is displayed as a tag object F104 as a whole. The tag object F104 is displayed to be aligned with the tag object F100 and the tag object F102.

Although the tag objects are arranged and displayed, for example, it is possible to switch the locations of the tag objects, and display the tag objects by being moved to different locations. In addition, it is possible to change the color or change the attribute, and it is also possible to change size thereof after the change.

In addition, in FIG. 5B, although the area R100 including the handwritten object is displayed by being reduced because the area R100 is greater than the area R102 indicating the tag size, the area may be displayed as it is in a case where the area is small, and the area may be displayed by being enlarged so as to be displayed maximally in an area (that is, tag label) of the tag size.

In addition, if the input mode of the input device 20 of FIG. 5A is the "handwriting pen mode", a case of FIG. 5A is adopted. That is, the handwritten object H100 is displayed as it is as the drawing object, and is not converted to the tag object.

As described above, according to the present embodiment, by the input device 20 (for example, touch pen), a graphic input by the handwriting is automatically displayed as the drawing object in a handwritten state or displayed as the tag object. The user can easily input and display a desired object by merely changing the input device without switching or specifying the input mode every time when the handwriting is input.

2. Second Embodiment

A second embodiment will be described. In the first embodiment, in step S114, the tag object is arranged and displayed, but in the present embodiment, a case where the tag object is arranged and not displayed will be described. For a functional configuration and a processing flow according to the first embodiment, the same parts will not be explained, and different parts will be mainly described.

Figure 6A:
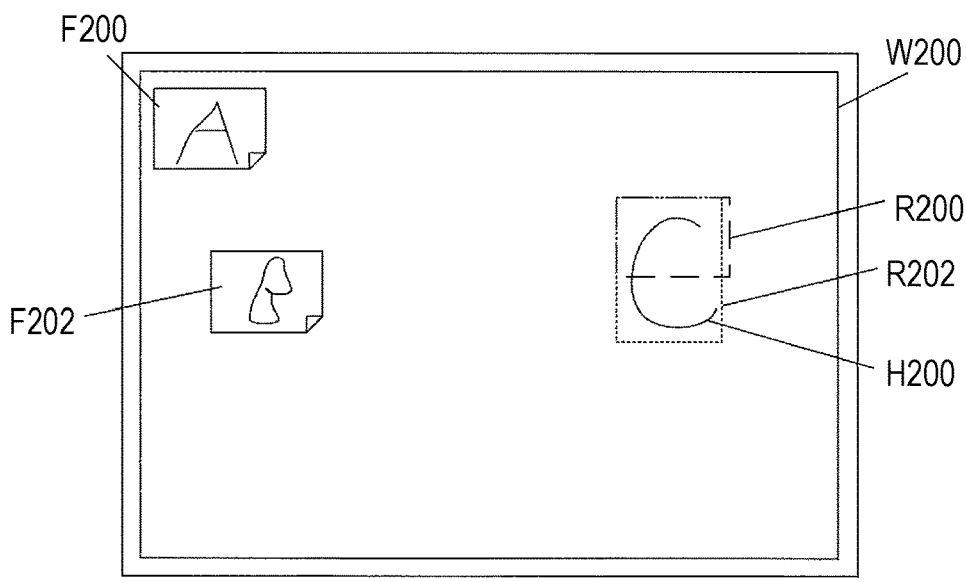
FIGS. 6A to 6C are diagrams for explaining operation examples according to a second embodiment.
Figure 6B:
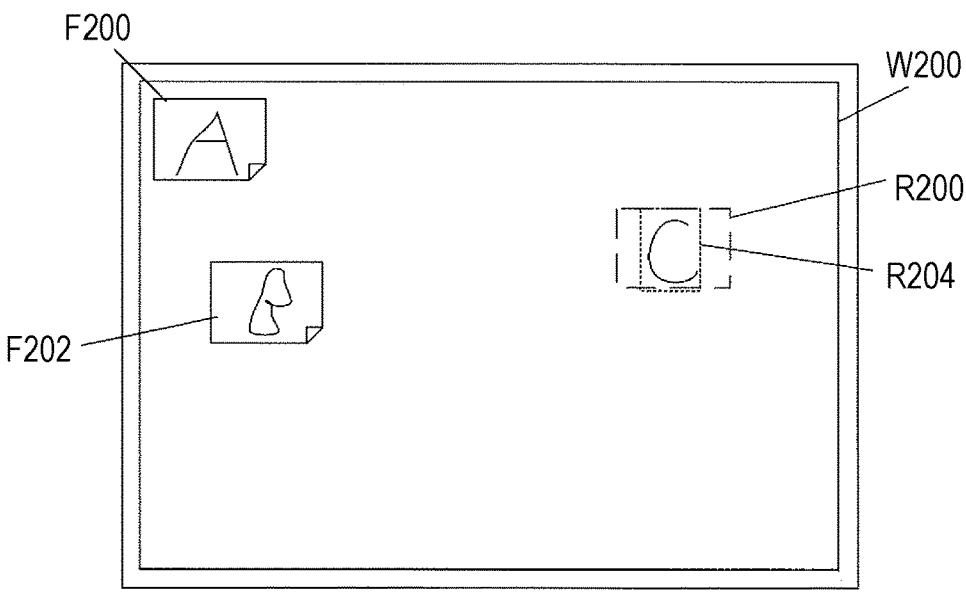
Figure 6C:
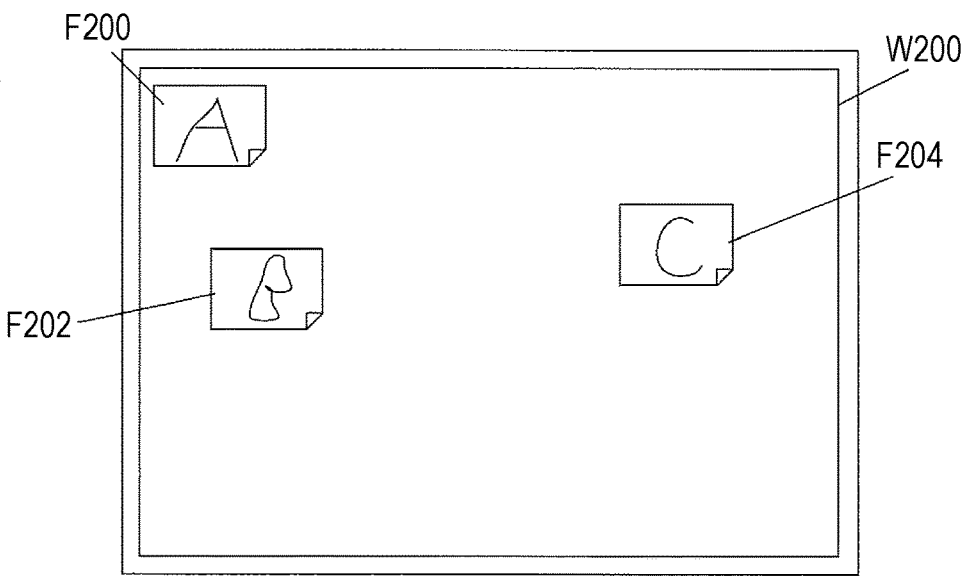

FIGS. 6A to 6C are diagrams for explaining operations in the second embodiment, or diagrams showing examples of a display screen W200.

As shown in FIG. 6A, in the present embodiment, a tag object F200 and a tag object F202 are displayed without arranging.

Here, an area R202 including a handwritten object H200 is recognized at this location. In addition, since the area R202 is larger than an area R200 indicating the tag size displayed as the tag object, a reduction display process is performed.

FIG. 6B schematically shows a state in which the tag object is reduced and displayed. In FIG. 6B, an area in which the handwritten object is to be displayed is displayed by being reduced to a size of an area R204. That is, the tag object is displayed by being reduced to a size of the area R200 that is the tag size when displaying such that the tag object enters the area R200.

As shown in FIG. 6C, the handwritten object is displayed by being reduced to the tag object F204. Locations of the handwritten object H200 and the tag object F204 can be appropriately set by a system and a user. For example, the location may be changed so as to coincide with the vertex coordinates such as the upper left and the upper right or to coincide with the center coordinates.

As described above, according to the present embodiment, it is possible to display the tag object at a predetermined location.

3. Third Embodiment

A third embodiment will be described. The third embodiment is an embodiment in which different tag objects for each attribute are displayed by storing further attributes in the input mode table 158.

In the first embodiment, as shown in FIG. 3, a result obtained by associating input information with the identification information is stored in the input mode table 158. In the present embodiment, the attribute is further stored.

The attribute may be an ID of the user, or may be a color of the tag. In addition, the attribute may be an attribute such as a line thickness and a color at the time of performing the handwriting input. In the present embodiment, user information is stored as the attribute.

In addition, the display apparatus 10 stores the attribute displayed for each user. For example, by storing the color of the tag object for each user, it is possible to display different colors of the tag object.

Figure 4:
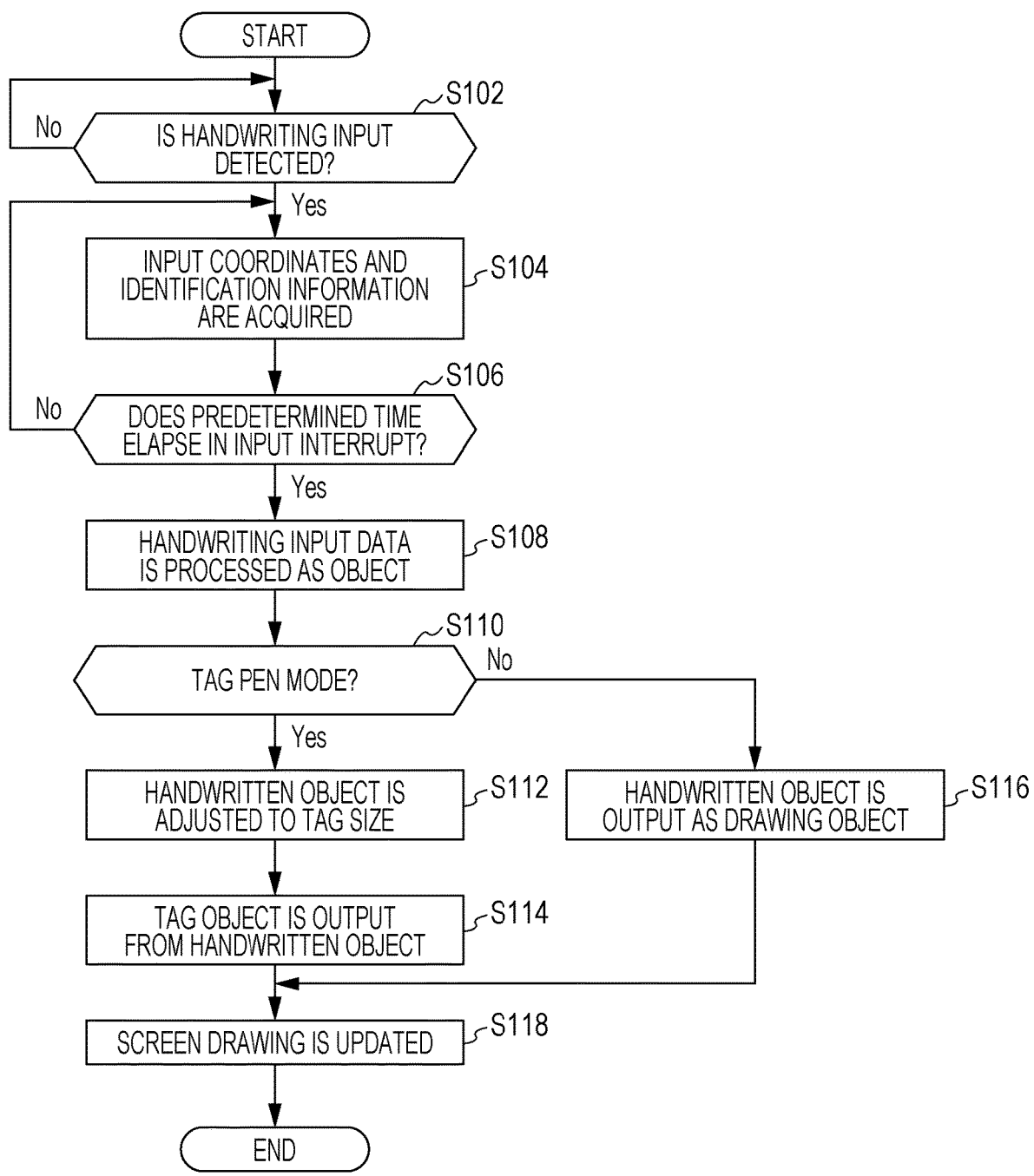
FIG. 4 is a diagram for explaining an outline of processing according to the first embodiment.
Figure 7:
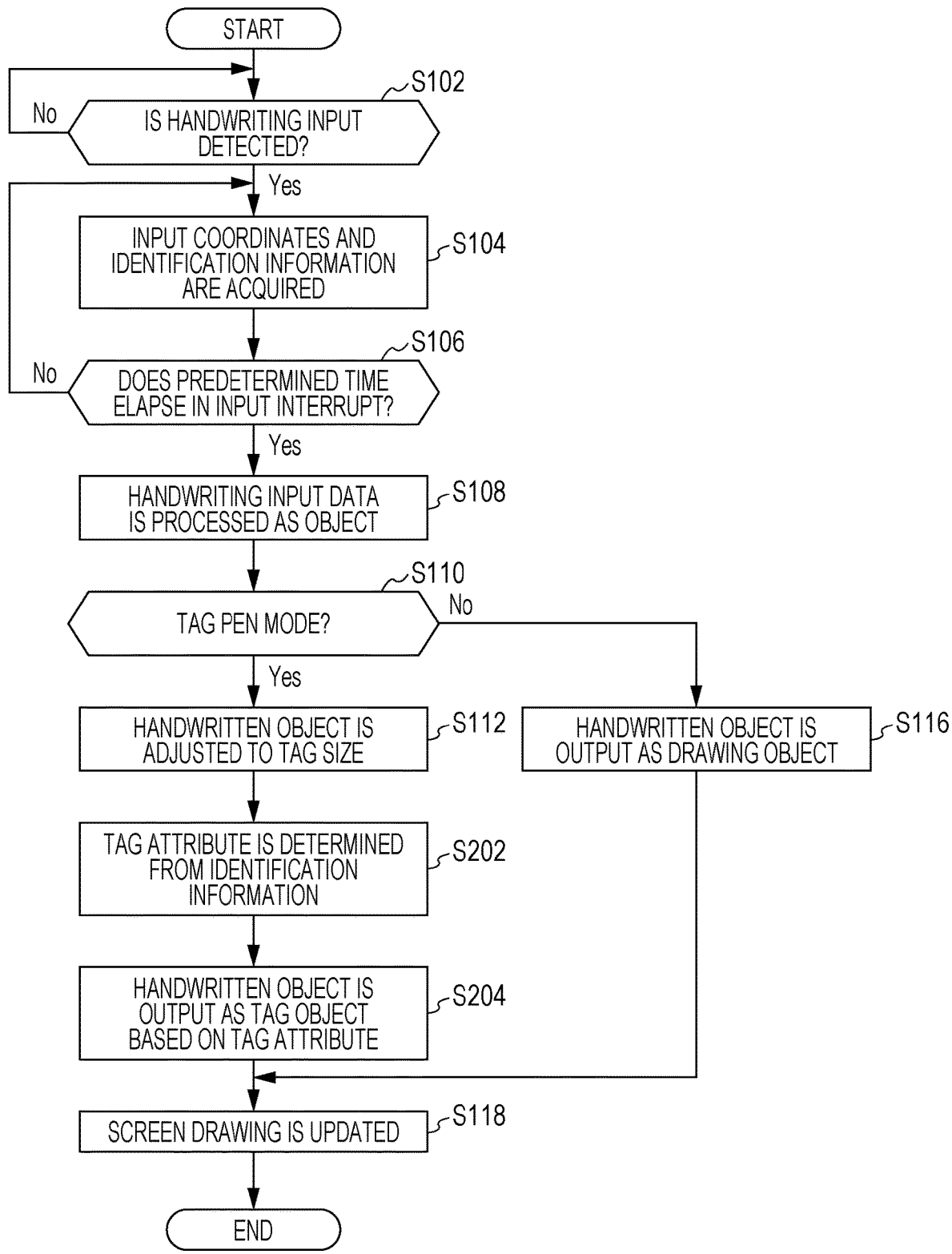
FIG. 7 is a diagram for explaining an outline of processing according to a third embodiment.

FIG. 7 is a processing flow in the present embodiment. A processing flow of FIG. 7 is a flow obtained by replacing a processing flow explained in FIG. 4 according to the first embodiment, and the same process is denoted by the same reference numerals.

In the processing flow of FIG. 7, after the handwritten object is adjusted to the tag size (size included in tag label), a tag attribute that is an attribute of the tag is determined from the identification information (step S202). Then, when the tag object is generated from the handwritten object, the tag object based on the tag attribute is generated and output (step S204).

Figure 8A:
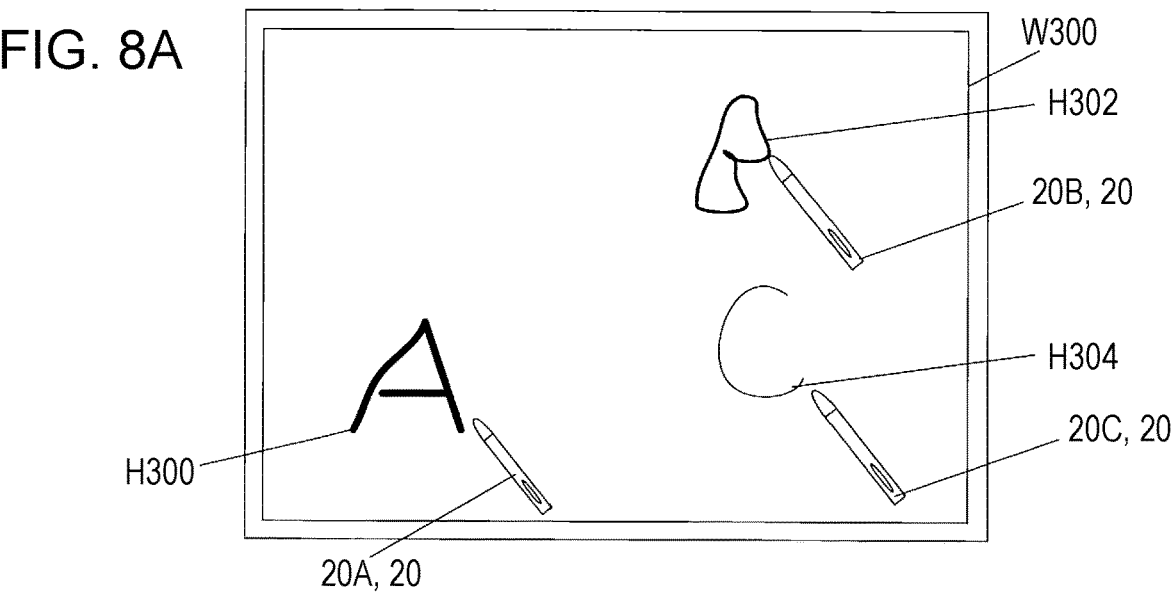
FIGS. 8A to 8C are diagrams for explaining operation examples according to the third embodiment.
Figure 8B:
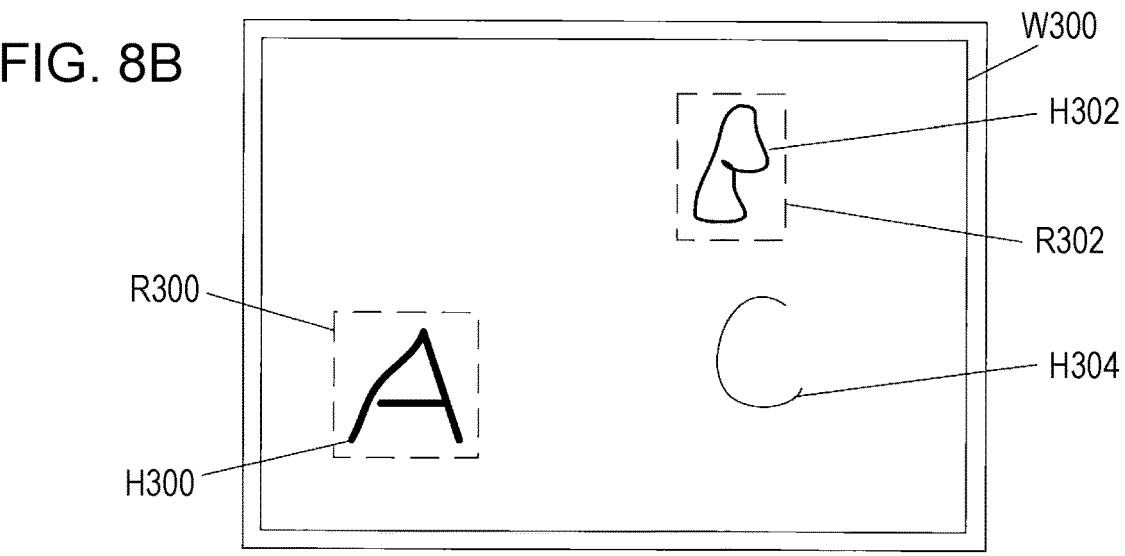
Figure 8C:
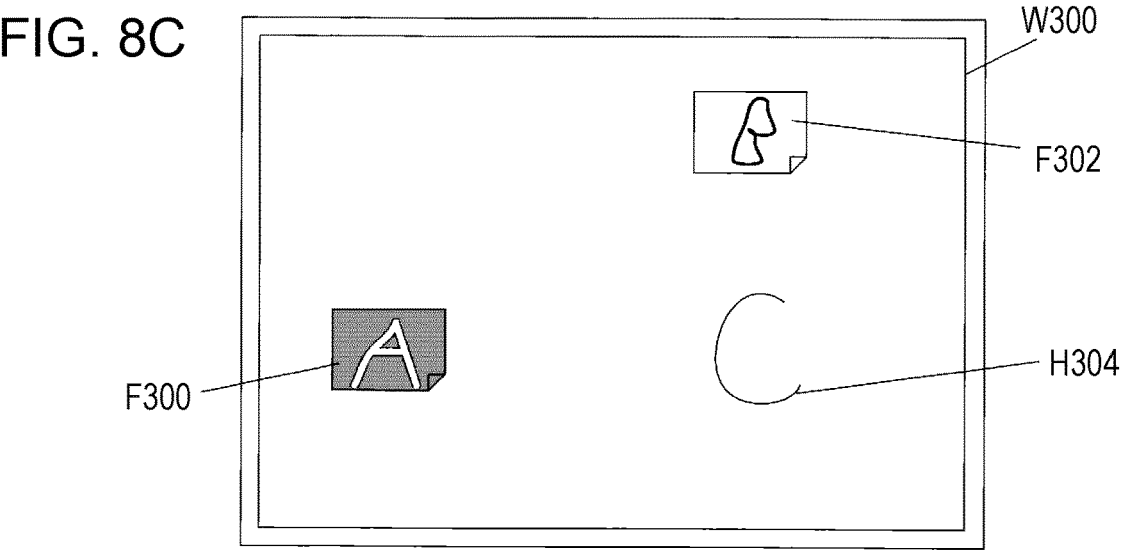

FIGS. 8A to 8C are diagrams for explaining operations in the third embodiment, and diagrams showing examples of a display screen W300.

As shown in FIG. 8A, a handwritten object H300 in an input device 20A, a handwritten object H302 in an input device 20B, and a handwritten object H304 in an input device 20C are displayed.

At this time, each of the handwritten objects is identified and displayed by associating the objects with the identification information of each input device 20. In this drawing, although the handwritten objects are indicated by a thickness of a line, the handwritten objects may be identified and displayed by colors (for example, handwritten object H300 is red, handwritten object H302 is blue, and handwritten object H304 is black).

In FIG. 8B, an area is recognized after performing the touch-up through each input device 20. Here, the input device 20A and the input device 20B are in the tag pen mode, and the input device 20C is in the handwriting pen mode.

In this case, when explaining in conjunction with FIG. 8C, an area R300 of the handwritten object H300 is recognized, and a tag object F300 is generated and displayed. In addition, an area R302 of the handwritten object H302 is recognized, and a tag object F302 is generated and displayed.

In addition, the tag object is generated and displayed in a display state in accordance with the attribute. For example, a background with the same color as that of the handwritten object may be output, or may be displayed in a display state in accordance with the attribute (tag attribute) of the tag object set for each input device 20 (for each identification information). In addition, the handwritten object H304 is displayed as the drawing object as it is.

As described above, according to the present embodiment, it is possible to display the display state by changing the display state of the tag object in accordance with the identification information of the input device 20.

4. Fourth Embodiment

A fourth embodiment will be described. In the first embodiment, in step S112, the handwritten object is adjusted and displayed to fit to the tag size. In the present embodiment, an embodiment in which although the object is reduced so as to include at least the size of one side, the tag object is generated in accordance with the size of other sides, will be described. For the functional configuration and the processing flow according to the first embodiment, the same parts will not be explained, and different parts will be mainly described.

Figure 9A:
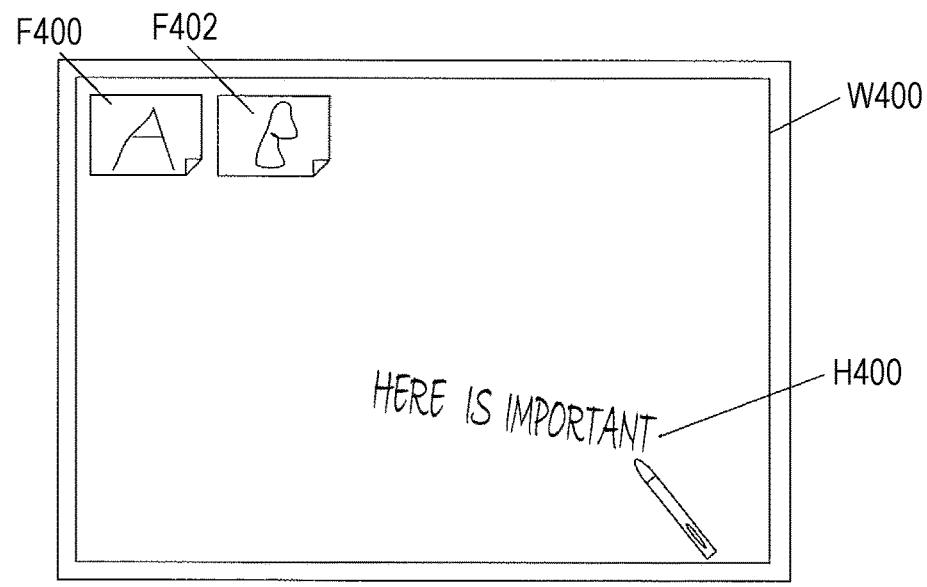
FIGS. 9A to 9C are diagrams for explaining operation examples according to a fourth embodiment.
Figure 9B:
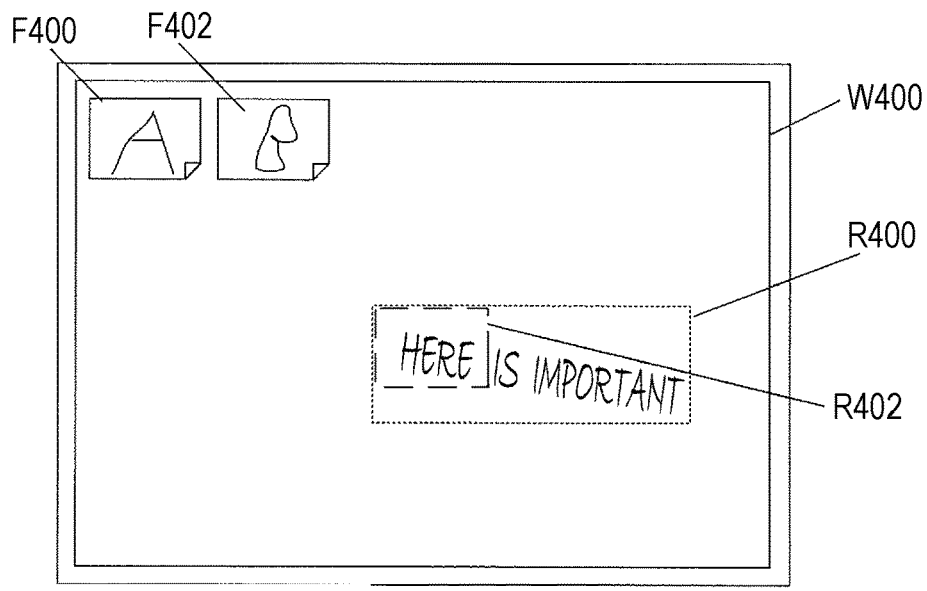
Figure 9C:
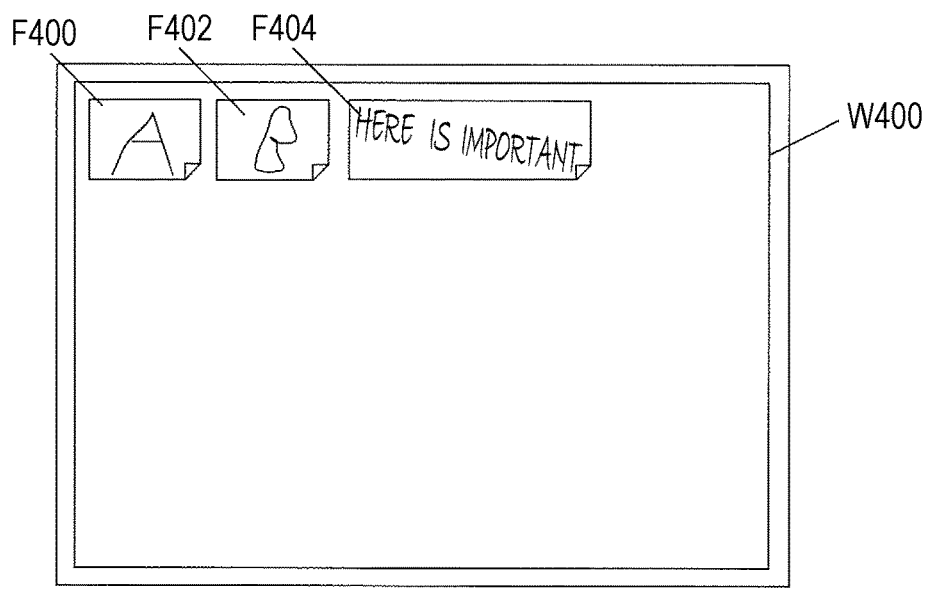

FIGS. 9A to 9C are diagrams for explaining operations in the fourth embodiment, and diagrams showing examples of a display screen W400.

As shown in FIG. 9A, a tag object F400 and a tag object F402 in the present embodiment are arranged and displayed.

Here, in a case where it is determined that the handwritten object H400 is input from the attribute of the input device 20 in the tag pen mode, the tag object is generated based on the handwritten object H400.

As shown in FIG. 9B, an area including the handwritten object H400 is R400, and is formed with a size greater than a size of an area R402 of the tag size. Therefore, in the present embodiment, it is assumed that a size in the vertical direction is reduced so as to be the same size as the tag size and a size in the horizontal direction is formed by expanding the size (that is, size of tag label) of the tag object as it is.

As shown in FIG. 9C, a tag object F404 is generated and displayed by being expanded in the vertical direction when comparing with other tag objects. Here, since they have the same length in the vertical direction, it is possible to display without discomfort even if the arranging is performed.

As described above, according to the present embodiment, it is assumed that the tag object is generated by being reduced so as to be a size of at least a side of the tag object having the same size of the tag size when the tag object is generated.

With this, it is possible to suppress reduction of the handwritten object to an exceedingly small size, or it is possible to display the handwritten object without discomfort due to an arrangement direction.

5. Application Example

By using the display control device of each embodiment described above, it is for the user to appropriately display the object according to the input device.

In addition, by performing automatically attachment as a tag sheet of a fixed size when writing is performed with a specific pen, it is possible to acquire convenience that it is easy to arrange the tag without forming small letters with difficulty.

For example, it is difficult to write small letters to the size of the tag, because there are problems that the display device is vertically installed and it is not possible to perform writing of the hand as the pen on the touch panel due to constraints of the touch panel in a case where the display device is used in a device such as an electronic blackboard.

However, by using the disclosure of the present embodiment, even if the user does not write small letters to the tag note, it is possible to put an idea into a small tag note such that the idea can be arranged later.

6. Modification Example

The present disclosure is not limited to the embodiments described above, and various modifications are possible. That is, embodiments obtained by combining technical means appropriately modified within the scope not deviating from the gist of the present disclosure are also included in the technical scope of the present disclosure.

In addition, each function may be configured with a program, or may be configured with hardware. In a case where it is realized by a program, the program may be executed by being recorded on a recording medium and by reading the program from the recording medium, or may be executed by downloading the program stored in a network.

In addition, in the above-described embodiment, as an example, an operation on a touch detection unit is described as a touch operation (tap operation) on the touch panel, but, for example, an operation such as a click operation or the like by an external input device such as a mouse may be performed.

In addition, according to the above-described embodiment, although it is described that the display control device includes the display device, the display control device may not include the display device. For example, the display device including the touch panel may be connected to a computer as the display control device. In this case, for example, by connecting the display device and the computer with a USB technology, it is possible to acquire the input coordinates on the touch panel in the computer. In addition, by outputting the tag object to the display device through the HDMI (registered trademark) technology or the like, it is possible to display the tag object or the like. In addition, a control signal or a display control signal under the technologies may be connected to one signal line.

In addition, in the above-described embodiment, an example in which the display device includes the display unit and an operation input unit, is described. However, it goes without saying that other methods may be used to implement the disclosure disclosed in this embodiment. For example, a projector may be used as the display unit 110, and a human detecting sensor may be used as the touch detection unit 120. Then, by connecting a control computer to the touch detection unit 120 and the display unit 110, a display system may be realized.

In addition, for convenience of explanation, the above-described embodiments are described separately, but it goes without saying that they may be combined and executed within a technically feasible range.

As described above, the embodiments described in this specification can be performed in combination in a range without inconsistency.

In addition, a program for operating each device in the embodiment is a program (program for functioning computer) for controlling the CPU or the like so as to realize the function of the above-described embodiment. Information handled in these devices is temporarily stored in a temporary storage device (for example, RAM) at the time of processing, and then, the information is stored in a storage device such as various ROMs, HDDs, and SSDs, and read, modified, and written by the CPU according to need are performed.

In addition, in a case of distributing to the market, a program can be stored in a portable recording medium and distributed, or transferred to a server computer connected via a network such as the Internet. In this case, of course, the storage device of the server computer is also included in the present disclosure.

In addition, it may be realized by installing and performing an application having each function in various devices such as a smartphone, a tablet, and an image forming apparatus.

The present disclosure contains subject matter related to that disclosed in Japanese Priority Patent Application JP 2017-191548 filed in the Japan Patent Office on Sep. 29, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display control device comprising:
a controller that controls a display connected to the controller, wherein the controller
receives identification information that identifies an input device from the input device;
receives a handwriting input through a touch panel;
generates one or more objects from the handwriting input; and
displays at least one of the one or more objects on a display area of the display,
wherein based on the identification information, the controller determines whether or not the at least one of the one or more objects is converted into a tag object, and
in a case of conversion into the tag object, the controller combines the at least one of the one or more objects and a tag label that is a figure object having a predetermined size so that the at least one of the one or more objects is included in the tag label, and generates the tag object by determining a background color based on the identification information, the tag object being movable to an optional different position and resizable,
in a case other than the conversion into the tag object, the controller generates a drawing object from the handwriting input, and
the tag object or the drawing object is displayed on the display area of the display, and wherein a size of the tag object included in the tag label is changed according to size change of the tag label.

2. The display control device according to claim 1, wherein the tag object is displayed with the predetermined tag size, and
wherein the size of the tag object is reduced to be within the tag size in the case of conversion into the tag object.

3. The display control device according to claim 2, wherein the size of the tag object is reduced in such a manner that a size of at least a side is the tag size.

4. The display control device according to claim 1, wherein the tag object is generated when a predetermined period of time elapses after the handwriting input is not received.

5. The display control device according to claim 1, further comprising
an input mode table in which the identification information and an input mode is stored in association with each other,
wherein the input mode table is referred to based on the identification information, and, at a time of performing the handwriting input, the object is generated as the tag object in a case where the input mode is a tag pen mode, and the object is generated as the drawing object in a case of another input mode.

6. The display control device according to claim 5, wherein an attribute in association with the identification information is further stored in the input mode table, and
wherein a display state based on the attribute is determined and the object is displayed in the determined display state in a case where the object is displayed.

7. A non-transitory recording medium that stores a program causing a computer of a display control device to execute:
receiving identification information that identifies an input device from the input device;

receiving a handwriting input through a touch panel;
generating one or more objects from the handwriting input; and
displaying at least one of the one or more objects on a display area of the display,
based on the identification information, determining whether or not the at least one of the one or more objects is converted into a tag object, and
  in a case of conversion into the tag object, combining the at least one of the one or more objects and a tag label that is a figure object having a predetermined size so that the at least one of the one or more objects is included in the tag label, and generating the tag object by determining a background color based on the identification information, the tag object being movable to an optional different position and resizable,
  in a case other than the conversion into the tag object, generating a drawing object from the handwriting input, and
displaying the tag object or the drawing object on the display area of the display,
wherein a size of the tag object included in the tag label is changed according to size change of the tag label.

* * * * *